United States Patent

Okuyama et al.

[15] 3,660,739

[45] May 2, 1972

[54] MEANS TO PROMOTE THE COMMUTATION OF A THYRISTOR SWITCHING ARRANGEMENT FOR AN ELECTRIC MOTOR AT LOW MOTOR SPEEDS

[72] Inventors: Toshiaki Okuyama; Hiroshi Watanabe, both of Hitachi, Japan

[73] Assignee: Hitachi, Ltd., Tokyo, Japan

[22] Filed: Dec. 8, 1970

[21] Appl. No.: 96,169

[30] Foreign Application Priority Data

Dec. 8, 1969 Japan..................................44/97872

[52] U.S. Cl............................................318/227, 318/230
[51] Int. Cl.........................................................H02p 5/40
[58] Field of Search..................318/171, 138, 227, 230, 254

[56] References Cited

UNITED STATES PATENTS 3,262,036  7/1966  Clarke et al........................318/138 X

*Primary Examiner*—Gene Z. Rubinson
*Attorney*—Craig, Antonelli, Stewart & Hill

[57] ABSTRACT

An electric motor system consisting of switching means, such as an inverter, and a synchronous motor, means to promote the commutation action of the switching means at starting, comprising two polyphase windings mounted on the stator of the synchronous motor with magnetic coupling, one of the polyphase windings being connected to produce the rotating magnetic field with the direct current source through the switching means and the other polyphase winding being energized by an external alternating current source in order to supply commutating energy to the switching means.

12 Claims, 10 Drawing Figures

FIG. 1
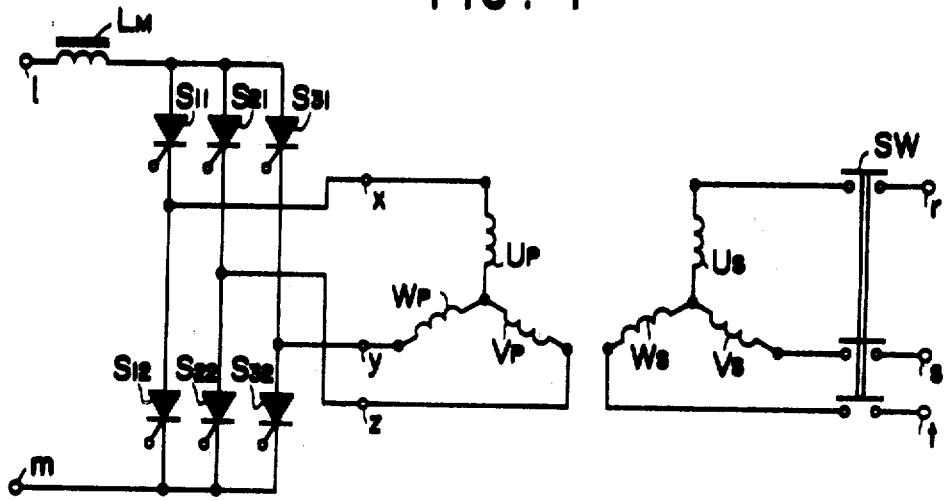
FIG. 2a
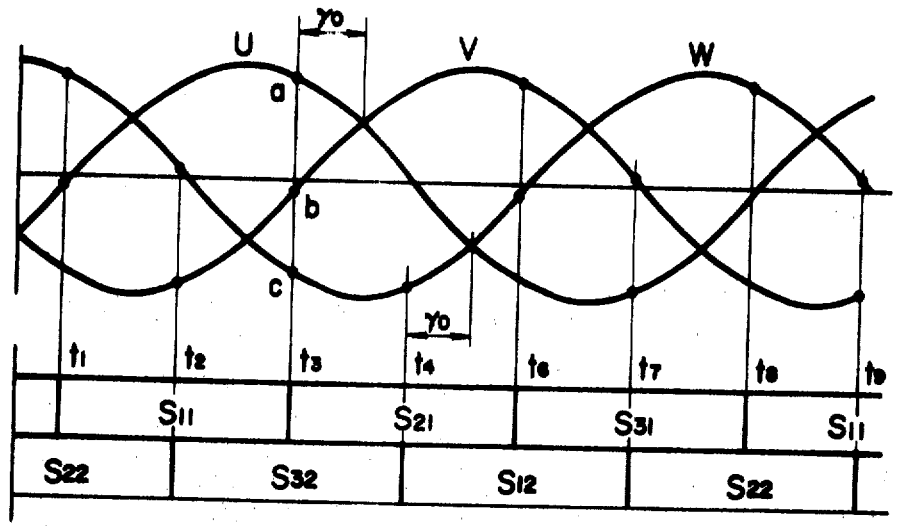
FIG. 2b
INVENTORS
TOSHIAKI OKUYAMA & HIROSHI WATANABE
BY Craig, Antonelli,
Stewart & Hill
ATTORNEYS INVENTORS
TOSHIAKI OKUYAMA & HIROSHI WATANABE
BY Craig, Antonelli, Stewart & Hill
ATTORNEYS INVENTORS
TOSHIAKI OKUYAMA & HIROSHI WATANABE
BY Craig, Antonelli, Stewart & Hill
ATTORNEYS 3,660,739

MEANS TO PROMOTE THE COMMUTATION OF A THYRISTOR SWITCHING ARRANGEMENT FOR AN ELECTRIC MOTOR AT LOW MOTOR SPEEDS

BACKGROUND OF THE INVENTION

The present invention relates to improvements in electric motor control systems including the use of thyristors.

A motor control system using thyristors is well known as a means of controlling a variable speed motor (e.g., direct current motor), in which contactless switching elements, such as gate turn on and nongate turn-off controlled rectifiers, are used instead of the commutator and the brush to eliminate the malfunctions caused by friction. These kinds of electric motor control systems are called thyristor motor systems, or sometimes brushless motor systems.

Generally, the thyristor motor system consists of an alternating current motor and switching means, such as an inverter or converter, and is classified into an a.c. input type and a d.c. input type by the sort of input voltage applied to said switching means. Both types of systems have respective features. As the present invention particularly relates to the d.c. input type, the following description relates particularly to that type.

The d.c. input type thyristor motor system comprises an alternating current motor and switching means for converting a direct current to a polyphase alternating current. The switching means comprise a plurality of semiconductor controlled rectifiers, so-called thyristors. The thyristors are turned on by gate signals applied to the gate electrodes one after another in a predetermined order according to the relative position of the stator and the rotor of the alternating current motor, and are commutated by the backwardly applied counter electromotive force of the alternating current motor.

It is well known that the counter electromotive force of an alternating current motor is proportional to the rotating speed of the motor, if the field intensity is constant. Therefore, when the speed of the motor is very low, the voltage does not become high enough to commutate the thyristors. Most notably, the counter electromotive force is very low at or during starting.

When a larger starting torque is required, the above-mentioned commutation becomes more difficult. Accordingly, a conventional d.c. input type thyristor motor system normally uses a starting means, which is mechanically linked with the rotor of the motor and rotates the rotor at starting in order to produce the necessary counter electromotive force. The starting means not only complicates the structure of the thyristor motor system but makes it very expensive.

SUMMARY OF THE INVENTION

An object of the present invention is to provide an electric motor system controlled by thyristors which is designed so as to easily perform the required commutation at or during starting or at a low motor speed.

Another object of the present invention is to provide a thyristor motor system which can start with a heavy load.

According to one aspect of the present invention, an electric motor system comprises a rotating machine having a polyphase winding comprising a plurality of windings in either a stator or a rotor, switching means for connecting the individual windings to a direct current source one after another in a predetermined order according to the relative position of the stator and the rotor of the rotating machine, and additional commutating means for supplying the commutation energy to the switching means from the external source through the polyphase winding in order to promote the commutation action of the switching means.

Other objects and features of the present invention will become apparent from the following description of embodiments of the invention when taken in conjunction with the accompanying drawings.

BRIEF DESCRIPTION OF THE DRAWINGS

FIG. 1 is an electrical circuit diagram showing a preferred embodiment of the invention;

FIGS. 2a and 2b, and FIGS. 3a, 3b and 3c are waveform and other diagrams for explaining the action of the system shown in FIG. 1;

DETAILED DESCRIPTION OF THE PREFERRED EMBODIMENTS

Figure 3A:
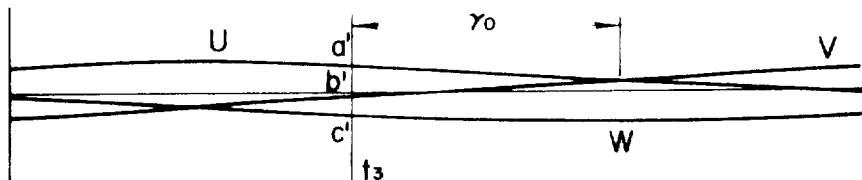

One of the preferred embodiments of the present invention will be described with reference to FIG. 1. The rotating machine used in this embodiment is a three-phase alternating current motor and consists of a rotor (not shown) and a stator having additional three-phase windings (Us, Vs, Ws) mounted on a stator core together with stationary windings (Up, Vp, Wp). The two polyphase windings are magnetically coupled on the same stator core. The additional three-phase winding is connected with an external three-phase alternating current source through a switch SW at terminals $r$, $s$ and $t$. The stationary winding is connected with the output terminals $x$, $y$ and $z$ of a thyristor switching means.

The switching means comprises six gate turn-on, nongate turn-off controlled rectifiers, namely thyristors $S_{11}$, $S_{12}$, $S_{21}$, $S_{22}$, $S_{31}$ and $S_{32}$ connected in three phase graetz connection. Input terminals $l$ and $m$ are supplied with direct current voltage and the thyristors are ignited one after another in a predetermined order according to the relative position of the stator and the rotor of the rotating machine, whereby a three-phase alternating current voltage is induced at the output terminals $x$, $y$ and $z$.

The three-phase stationary winding energized by the voltage induced across the terminals $x$, $y$ and $z$ produces the three-phase rotating magnetic field and the rotor is caused to rotate by such a rotating magnetic field. While the rotor is rotating, the counter electromotive forces are produced in the stationary winding (Up, Vp, Wp).

FIGS. 2a and 2b, respectively, show the change of the above-mentioned counter electromotive forces and the ignition order of the thyristors. Referring to these figures, the rotating action of an ordinary thyristor motor system will be described hereunder. The curve U shows a voltage produced on a winding Up, and similarly curves V and W, respectively, show voltages produced on windings Vp and Wp.

The points $t_1$–$t_9$ are time points at which the commutation is carried out from the one thyristor to the other. In FIG. 2b, each duration shown by the symbol corresponding to each thyristor represents the conducting period of the thyristor.

For example, during the time between points $t_2$ and $t_3$, the thyristors $S_{11}$ and $S_{32}$ are conductive and windings Up and Wp are connected with the direct current source. Then, the windings Up and Wp induce the voltages as shown by curves U and W in FIGS. 2a. As the winding Vp induces the voltage shown by curve V, the electrical potential of the anode of the thyristor $S_{21}$ equals the voltage $(V - W)$, measured from a negative terminal $m$. Further the electrical potential of the cathode thereof becomes voltage $(U - W)$ in like manner. Therefore, the voltage difference $(U - V)$ is applied forwardly across the anode and the cathode of the thyristor $S_{21}$.

At the time point $t_3$, the thyristor $S_{21}$ is ignited and becomes conductive so that the voltage difference $(U - V)$ is applied backwardly to the thyristor $S_{11}$ through the circuit of $S_{21} - Vp - Up - S_{11} - S_{21}$. As well known, in order to recover the cut-off condition of a thyristor in conduction, the backward voltage must be applied to the thyristor across the anode and the cathode thereof, or the forward current through the thyristor must decrease down to less than the conduction holding current. In said case, the voltage $(U - V)$ is used as the above-mentioned backward voltage. After the thyristor $S_{11}$ is turned off thereby, windings Vp and Wp are connected to the direct current source through the thyristors $S_{21}$ and $S_{32}$.

As above-mentioned, if the rotor rotates at a high speed, the commutation of each thyristor is very easily performed, since each winding produces a voltage high enough to commutate the thyristors. But, if the speed of the rotor is extremely low or zero, the thyristors cannot commutate by means of the counter electromotive force.

The present invention provides an additional commutating means for promoting turn-off of the thyristors while the speed of the rotor is extremely low or zero. In FIG. 1a, the additional windings Us, Vs and Ws are provided on the stator core, which windings are magnetically coupled with windings Up, Vp and Wp. If the alternating current voltage is applied to the windings Us, Vs and Ws, alternating current voltages will be induced in the windings Up, Vp and Wp by transformer action. The voltage applied to terminals $r$, $s$ and $t$, and the turn ratio between additional winding (Us, Vs, Ws) and stationary winding (Up, Vp, Wp) will be determined such that the voltages induced in the windings Up, Vp and Wp become high enough to commutate the thyristors.

Figure 3B:
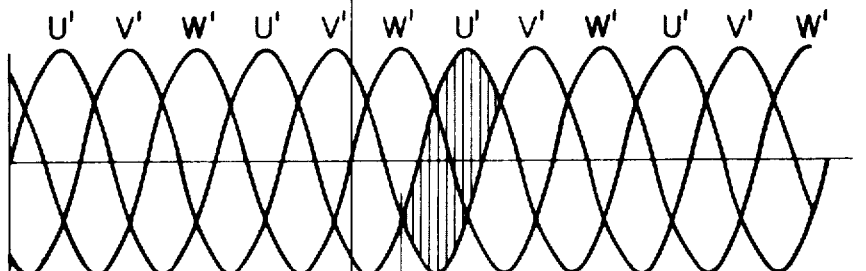
Figure 3C:
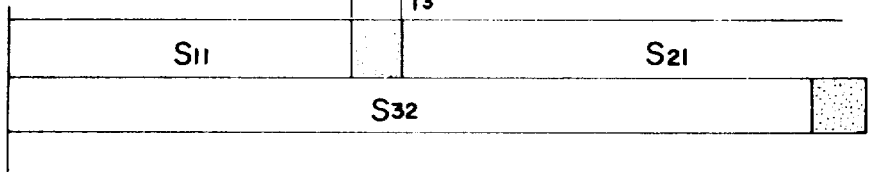

FIGS. 3a, 3b and 3c explain the function of the system when the rotor is rotated at a very low speed. FIG. 3a shows the counter electromotive forces, FIG. 3b shows the three-phase voltages U', V' and W' applied across the windings Us, Vs and Ws, and FIG. 3c shows the conducting term of each thyristor. The symbols used in FIGS. 3a, 3b and 3c are similar to those in FIGS. 2a and 2b except for voltages U', V' and W'.

While the speed of the rotor is low, the counter electromotive forces are extremely low, as shown in FIG. 3a. At that time, the switch SW is switched on. The windings Us, Vs and Ws thereby receive the voltages as shown in FIG. 3b. The voltages applied across the windings Us, Vs and Ws induce in the windings Up, Vp and Wp the predetermined voltages having the same waveform as shown in FIG. 3b.

Then, if the gate signal is fed to the gate of the thyristor $S_{21}$ at the time point $t_3$, the thyristor $S_{21}$ turns on, but yet the thyristor $S_{11}$ cannot turn off, because the counter electromotive force is extremely low as shown at $a'-b'$ in FIG. 3a, and further the voltage (U'− V') is negative as shown in FIG. 3b so that a forward voltage is applied to the thyristor $S_{11}$ as a whole.

At the time point $t'_3$, however, the voltage (U'− V') becomes positive. Hereafter, to the thyristor $S_{11}$ is applied a backward voltage high enough to commutate. Accordingly, the overlapping interval $\Delta = (t'_3 - t_3)$ occurs, and in the interval $\Delta$ both thyristors $S_{11}$ and $S_{21}$ are conductive. After the time interval $\Delta$, the thyristor $S_{11}$ turns off and only the thyristor $S_{21}$ is conductive.

If the frequency of the voltage applied across windings Us, Vs and Ws is 50 or 60 Hertz per second (commercial frequency in Japan), the voltage (U'− V') being positive is sure to exist during an angle γo. Thus, each thyristor is ignited at a predetermined electric angle γo after a voltage of one phase is equal to that of the other. The electric angle γo is generally called the control angle, and as well known, this is determined by a margin angle for commutation and an overlapping angle. The former is determined by a turn-off time of the thyristor used and/or a ripple rate of a current flowing through the thyristor, and the latter is influenced by the commutation inductance of the circuit and the value of the load current.

On the other hand, the frequency of the voltage shown by U', V' or W' is much higher than that of the voltage shown by U, V or W. If the control angle γo is selected to be sufficiently large, the voltage (U'− V') being positive is sure to exist during the control angle γo. The rotor acceleration and the counter electromotive force having been sufficiently high, the switch SW is opened. Hereafter, all thyristors can be commutated by electromotive force.

As an example, the switch SW may be opened when the counter electromotive force has become about 10 percent of the voltage corresponding to the rated speed. As mentioned above, the frequency and the value of the voltage applied across windings Us, Vs and Ws shall be selected such that a sufficiently high voltage is applied to the thyristors as a backward voltage when the switch SW is closed.

Figure 4B:
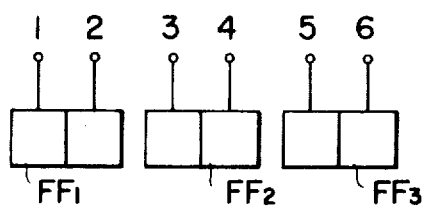
FIGS. 4a and 4b are schematic circuit diagrams showing a control circuit for the system shown in FIG. 1.
Figure 4A:
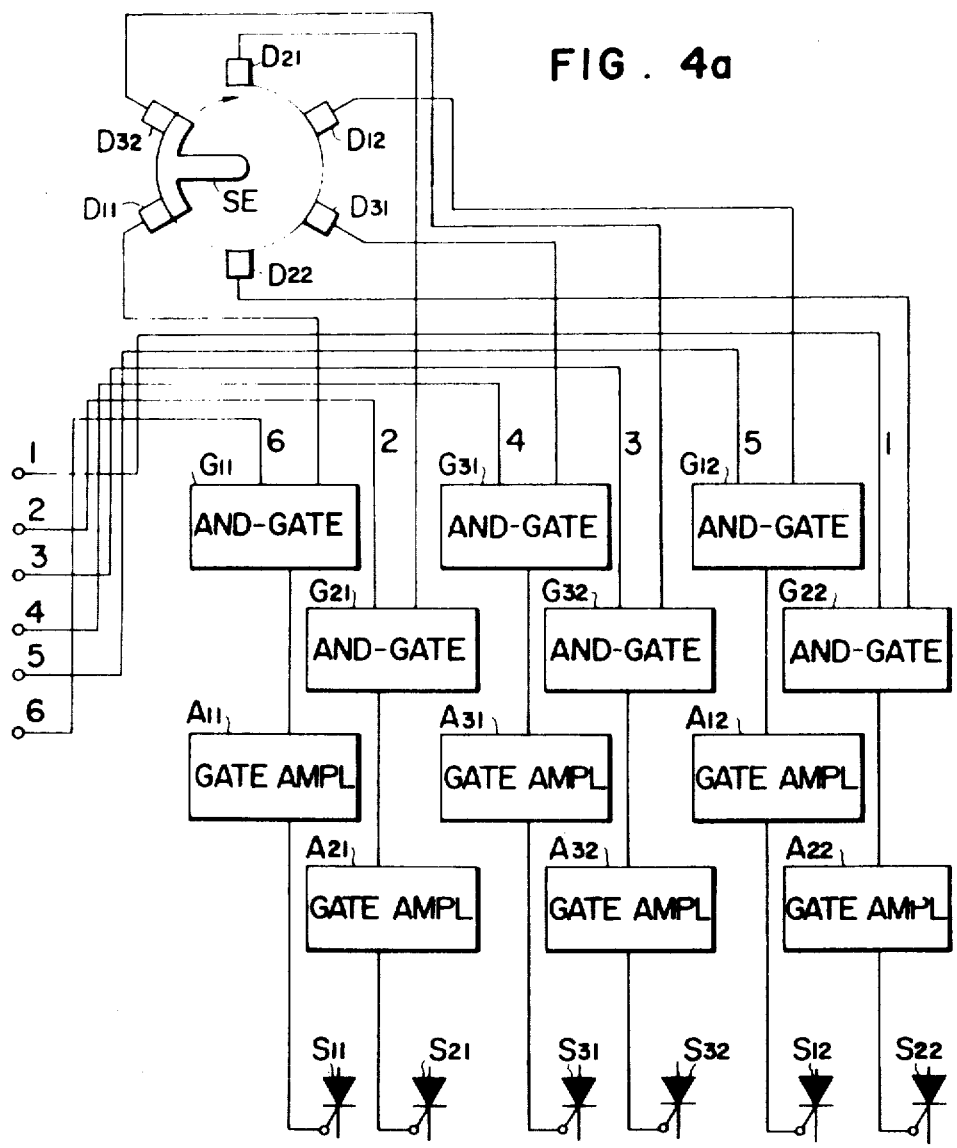

Next, referring to FIGS. 4a and 4b, the control circuit of the thyristors as shown in FIG. 1 is explained. In these figures, the symbols $D_{11}$, $D_{21}$, $D_{31}$, $D_{12}$, $D_{22}$ and $D_{32}$ designate the position detectors. SE designates the segment, which is linked with the rotor and given the rotation in the direction shown by the arrow. The position detector faced by the segment produces the output which represents the position of the rotor. Each output is applied to AND-gates $G_{11}$, $G_{21}$, $G_{31}$, $G_{12}$, $G_{22}$ and $G_{32}$, respectively. The AND-gates are opened by signals applied to terminals 1 to 6. The outputs of the AND-gates are suppled to the gates of the thyristors through gate amplifiers $A_{11}$, $A_{21}$, $A_{31}$, $A_{12}$, $A_{22}$ and $A_{32}$.

The signals applied to terminals 1 to 6 are produced from Flip-Flop circuits $FF_1$, $FF_2$ and $FF_3$ shown in FIG. 4b. These Flip-Flop circuits are alternately and repeatedly set or reset by the polarities of the voltages (U − V), (V − W) and (W − U). For example, Flip-Flop $FF_1$ is reset to produce an output on the terminal 2 while the voltage (U − V) is positive, i.e., the duration shown by hatching in FIG. 3b. The output appearing on the terminal 2 is applied to the AND-gate $G_{21}$, and the AND-gate $G_{21}$ is opened thereby. At that time, if the position detector $D_{21}$ produces an output, the output is applied to the gate of the thyristor $S_{21}$ through the gate amplifier $A_{21}$. The Flip-Flops $FF_2$ and $FF_3$ operate also in like manner.

Specific means for alternately setting or resetting these Flip-Flops is not shown in the figure; however, such means are easily provided. For example, the three voltage detectors are provided and they detect each phase voltage U', V' and W' applied to the windings Us, Vs and Ws (these voltages U', V' and W' synchronize with the voltages U, V and W induced in the windings Up, Vp and Wp). Further, voltages (U' − V'), (V' − W') and (W' − U') are derived by the detected voltage U', V' and W', and if the voltage (U' − V') is negative, Flip-Flop $FF_1$ is set, if the voltage (V' − W') is negative, Flip-flop $FF_2$ is set, and if the voltage (W'−U') is negative, Flip-Flop $FF_3$ is set.

But, if the two thyristors are permitted to conduct simultaneously during commutating from one of the thyristors to the other, for example, as shown in FIG. 3c, the above-mentioned Flip-Flops are not always necessary.

As mentioned above, in the circuit shown in FIG. 1, the energy for commutating the thyristors is provided by an external source through the additional commutating means. Accordingly, the thyristors in this embodiment are easily commutated even at a low speed of rotation.

Figure 5:
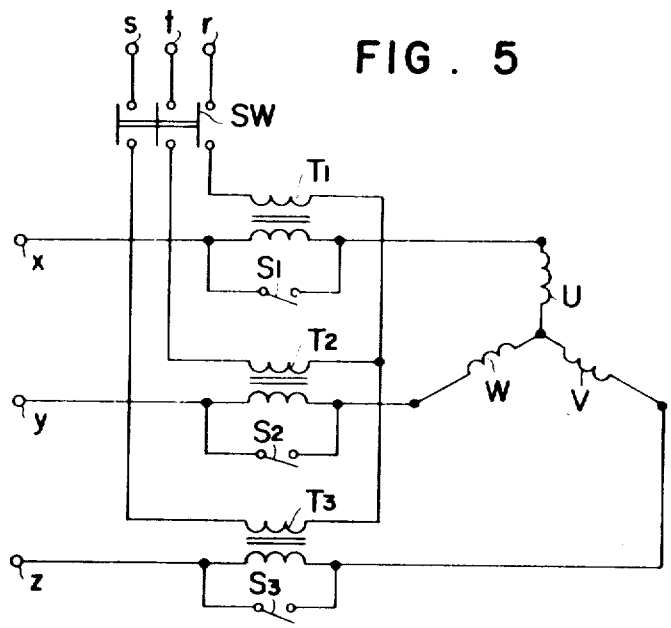
FIG. 5 and FIG. 6 are circuit diagrams, respectively, showing different preferred embodiments of the invention.
Figure 6:
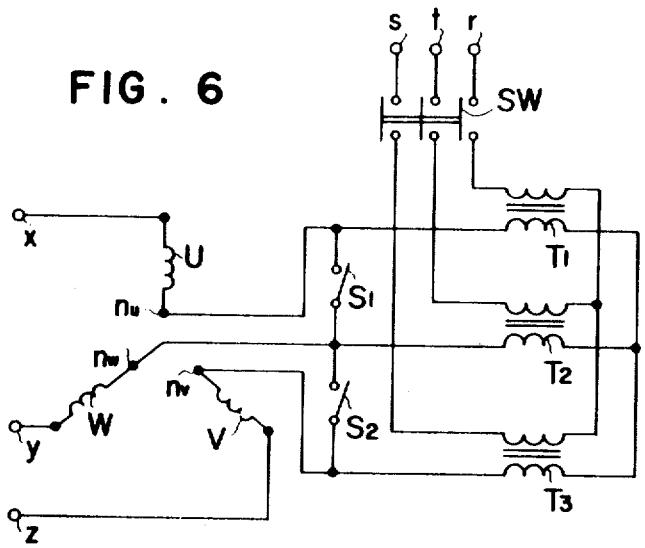

Next, referring to FIGS. 5 and 6, where similar reference symbols are used to denote the same parts as shown in FIG. 1, $T_1$, $T_2$ and $T_3$ represent transformers, which provide the energy of commutation to the thyristors (not shown). The transformers are modified three-phase transformers, of which the primary winding has a star-connection and is connected with terminals $r$, $s$ and $t$ through a switch SW. The one end of each secondary winding is connected with windings U, V or W, respectively, and the other end is connected to terminals $x$, $y$ or $z$, respectively. The thyristor portion in FIG. 5 is similar to that in FIG. 1. $S_1$, $S_2$ and $S_3$ represent switches provided to short-circuit the secondary winding of the transformer.

In this case, when the speed of the motor exceeds the predetermined speed, the switch SW is opened and switches $S_1$, $S_2$ and $S_3$ are closed so that the transformer is short-circuited.

Further, as shown in FIG. 6, the neutral point of the polyphase windings U, V and W is separated, and polyphase transformers $T_1$, $T_2$ and $T_3$ may be inserted therein. In the transformers of this embodiment, both the primary and the secondary windings are star-connected, and the primary windings are connected to terminals $r$, $s$ and $t$ through a switch SW in the same manner as the embodiment of FIG. 5. The secondary windings are connected with the separated neutral points Nu, Nv and Nw, and switches $S_1$ and $S_2$ are connected respectively in parallel with the two out of three secondary windings so that all of the windings are short-circuited by closing the switches $S_1$ and $S_2$. The operation of this circuit is entirely similar to that of the circuit shown in FIG. 5.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An electric motor system comprising a direct current source; rotating machine means including a polyphase winding for producing a rotating magnetic field in either a stator or a rotor; switching means including a plurality of gate turn-on, nongate turn-off controlled rectifiers for connecting the individual windings on the polyphase winding to the direct current source by rendering the controlled rectifiers conductive one after another in a predetermined order according to the relative position of the stator and the rotor of the rotating machine; additional commutating means including an additional polyphase winding associated with said polyphase winding for promoting the turn-off of the controlled rectifiers by absorbing reactive power stored in said rotating machine means and applying a backward voltage to said controlled rectifiers to be turned off through said polyphase windings; and a polyphase alternating current source, having a number of phases equal to the number of polyphase windings, for supplying alternating current power to the additional commutating means.

2. An electric motor system comprising a direct current source, rotating machine means including a polyphase winding for producing a rotating magnetic field in either a stator or a rotor; switching means including a plurality of gate turn-on, nongate turn-off controlled rectifiers for connecting the individual windings of the polyphase winding to the direct current source by rendering the controlled rectifiers conductive one after another in a predetermined order according to the relative position of the stator and the rotor of the rotating machine; additional commutating means associated with said polyphase winding for promoting the turn-off of the controlled rectifiers by applying a backward voltage to said controlled rectifiers to be turned off through said polyphase windings; and a polyphase alternating current source, having a number of phases equal to the number of polyphase windings, for supplying alternating current power to the additional commutating means, wherein said additional commutating means includes another polyphase winding which is magnetically coupled with the polyphase winding of said rotating machine on an iron core thereof in order to induce the backward voltage in the polyphase winding of the rotating machine by transformer action.

3. An electric motor system comprising a direct current source; rotating machine means including a polyphase winding for producing a rotating magnetic field in either a stator or a rotor; switching means including a plurality of gate turn-on, nongate turn-off controlled rectifiers for connecting the individual windings of the polyphase winding to the direct current source by rendering the controlled rectifiers conductive one after another in a predetermined order according to the relative position of the stator and the rotor of the rotating machine; additional commutating means including an additional polyphase winding associated with said polyphase winding for promoting the turn-off of the controlled rectifiers by absorbing reactive power stored in said rotating machine means and applying a backward voltage to said controlled rectifiers to be turned off through said polyphase windings; and a polyphase alternating current source, having a number of phases equal to the number of polyphase windings, for supplying alternating current power to the additional commutating means, wherein said additional commutating means includes a transformer having primary windings connected to the alternating current source, secondary windings connected with the polyphase windings and switch means for short-circuiting the secondary windings.

4. An electric motor system according to claim 3, wherein said polyphase winding is star-connected, and said secondary windings are connected with each phase of the polyphase winding, respectively.

5. An electric motor system according to claim 3, wherein said polyphase winding is star-connected, the neutral point of which is opened by each phase, and each said secondary winding is respectively connected with the opened neutral points according to each phase.

6. An electric motor system comprising a direct current source; rotating machine means including a polyphase winding for producing a rotating magnetic field in either a stator of a rotor; switching means including a plurality of gate turn-on, nongate turn-off controlled rectifiers for connecting the individual windings of the polyphase winding to the direct current source be rendering the controlled rectifiers conductive one after another in a predetermined order according to the relative position of the stator and the rotor of the rotating machine; additional commutating means including an additional polyphase winding associated with said polyphase winding for promoting the turn-off of the controlled rectifiers by absorbing reactive power stored in said rotating machine means and applying a backward voltage to said controlled rectifiers to be turned off through said polyphase windings; and a polyphase alternating current source, having a number of phases equal to the number of polyphase windings, for supplying alternating current power to the additional commutating means, wherein means is provided to electrically disconnect said additional commutating means from said polyphase winding when said rotating machine starts up to a speed producing a voltage high enough to independently commutate said controlled rectifiers.

7. An electrical control arrangement for increasing the starting counter electromotive force of a polyphase electric motor winding made up of winding portions selectively connected to a source of direct current by switching means including a plurality of gate turn-on, nongate turn-off controlled rectifiers under the control of means rendering the controlled rectifiers conductive one after another in a predetermined order according to the relative position of the stator and the rotor of the motor, comprising an additional polyphase winding coupled with said polyphase electric motor winding, and a polyphase alternating current source, having a number of phases equal to the number of winding portions making up said polyphase electric motor winding, selectively connected to said additional polyphase winding for supplying alternating power thereto.

8. An electrical control arrangement as defined in claim 7, wherein said polyphase electric motor winding and said additional polyphase winding are magnetically coupled by means of an iron core.

9. An electrical control arrangement as defined in claim 7, wherein said additional polyphase winding is made up of secondary windings of a transformer, said transformer having an equal number of primary windings connected to said alternating current source and additional switch means for selectively short-circuiting said secondary windings.

10. An electrical control arrangement as defined in claim 9, wherein said polyphase winding is star-connected, and said secondary windings are connected with each phase of the polyphase winding, respectively.

11. An electrical control arrangement as defined in claim 9, wherein said polyphase winding is star-connected, the neutral point of which is opened by each phase, and each said secondary winding is respectively connected with the opened neutral points according to each phase.

12. An electrical control arrangement as defined in claim 7, wherein means is provided to electrically disconnect said additional polyphase winding from said alternating current source when the motor reaches a predetermined speed after starting sufficient to produce a counter electromotive force high enough to independently commutate said controlled rectifiers.

* * * * *